Aug. 19, 1969  B. J. WILSON  3,462,309
MAGNESIUM ANODE PRIMARY CELL
Filed March 31, 1967  2 Sheets-Sheet 1
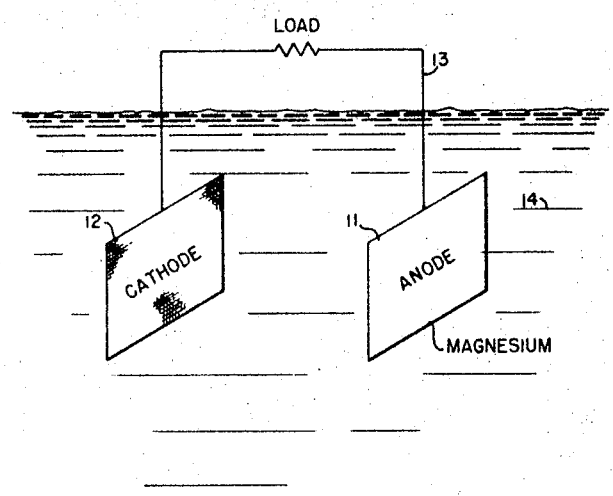
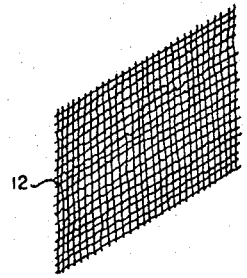
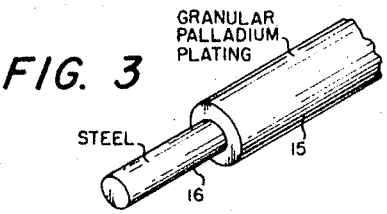
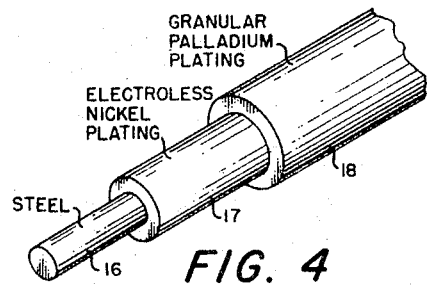
INVENTOR
BURTON J. WILSON

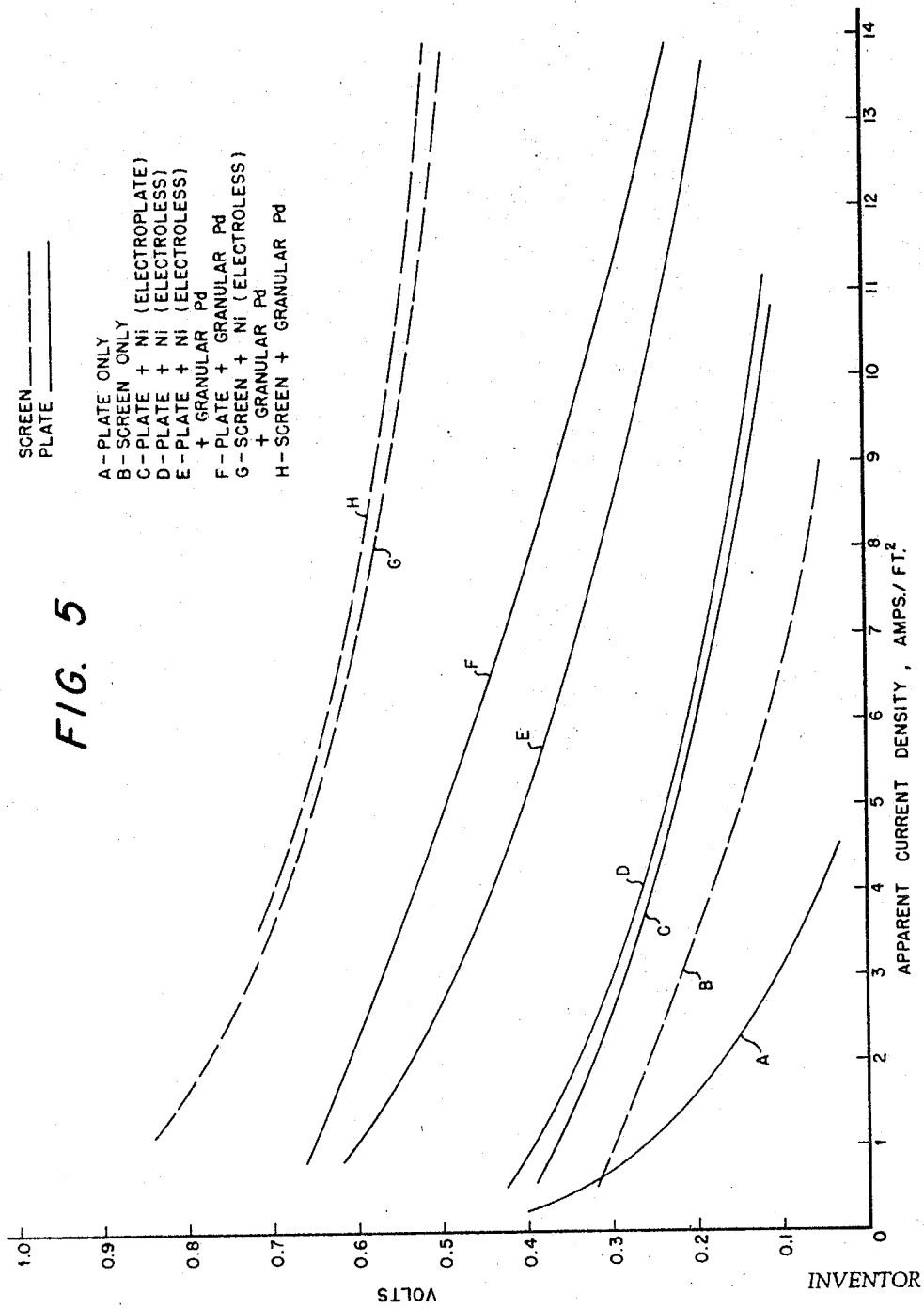

3,462,309
MAGNESIUM ANODE PRIMARY CELL
Burton J. Wilson, Bethesda, Md., assignor to the United States of America as represented by the Secretary of the Navy
Filed Mar. 31, 1967, Ser. No. 628,250
Int. Cl. H01m 13/06, 17/02
U.S. Cl. 136—100    4 Claims

ABSTRACT OF THE DISCLOSURE

A primary cell having a magnesium anode and an inert metal cathode which is a metal wire screen of from about 8 to 40 mesh having an outer surface of granular palladium plating which may be deposited on an intervening electroless nickel plating.

---

The invention described herein may be manufactured and used by or for the Government of the United States of America for governmental purposes without the payment of any royalties thereon or therefor.

This invention relates to improved primary cells of the magnesium anode-inert metal cathode type which are activated with sea water. The term inert is used herein to denote that the metal cathode is not consumed in operation of the cell. The new primary cells are useful as low voltage power sources for operation of sea-based devices such as sonar buoys and light beacons.

Background of invention

Primary cells which have a magnesium anode and an inert metal cathode when activated with water, which may be sea water, generate power on the basis of the occurrance of a reaction at the anode in which magnesium ions are formed and electrons released:

and a reaction at the cathode in which electrons are consumed and hydroxyl ions and hydrogen formed:

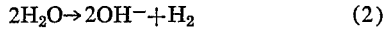

The electrons are transferred from the anode to the cathode by way of an external circuit in which the electrons perform work on a load to yield current. The overall or general reaction for operation of these cells is given by the equation:

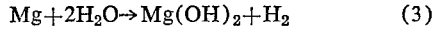

with the ultimate products of the operation of the cells being magnesium hydroxide, hydrogen and current.

The current output of a primary cell of the aforesaid type depends primarily on the rate of the reaction at the cathode. The faster the rate of this reaction the greater the adequacy of hydroxyl ions available in the electrolyte for reaction with magnesium ions to form the magnesium hydroxide and thereby the greater the current output of the cells. The reaction at the cathode is essentially one of removing hydrogen ions from the electrolyte water to leave hydroxyl ions therein. The removal of hydrogen ions is accomplished through ionization of water forming hydrogen ions and hydroxyl ions and reduction of the hydrogen ions to hydrogen which escapes as a gas from the electrolyte water.

Sea water batteries in which the primary cells have a magnesium anode and a solid plate inert metal cathode have a short service life at high current output rates, generally not more than about one to two hours.

The present invention has as a general object improvement in the efficiency of primary cells of the magnesium anode-inert metal cathode type which are activated with sea water.

A particular object of the invention is the provision of primary cells of the magnesium anode-inert metal cathode type which on activation with sea water will deliver low voltage power at high current output rates for longer periods of time than heretofore.

Another object is the provision of primary cells of the magnesium anode-inert metal cathode type which are equipped with an improved inert metal cathode.

Statement of invention

The above and other objects are accomplished in the new primary cells of my invention which comprises, broadly stated, a magnesium anode and an inert metal wire screen cathode in which the substrate screen is from about 8 to 40 mesh and has an outer surface of granular palladium plating. In a preferred embodiment of the cathode, the wire screen is from about 8 to 24 mesh and in a further preferred embodiment is from about 8 to 12 mesh.

The substrate wire metal screen of the improved cathode suitably may be a woven wire cloth, although other mesh constructions may be used. The inert metal of the substrate screen may be, for example, iron, mild steel, stainless steel, copper, brass, bronze, nickel, etc. The thickness of the improved cathode may vary and suitably is from about .002 to .031 inch.

Where it is desired to provide a greater measure of protection to the substrate metal wire screen of the cathode against corrosion by ambient humid atmosphere, the wire screen substrate may be first provided with an electroless nickel plating and the granular palladium plating applied to this intervening nickle plating. The presence of this intervening nickel plating is not preferred, however, from the standpoint of the activity of the cathode in operation of the cell.

The inert metal wire screen used as the cathode in the new primary cells is an openwork in which the wire of the screen has an outer surface of granular palladium plating and, optionally, may have an underplating of electroless nickel.

The anode of the new primary cells may be a plate or sheet of magnesium or of high magnesium base alloys as has been previously described in the art. High magnesium base alloys which contain small amounts of aluminum are preferred for the anode since they will yield a flakey corrosion product which is more easily dislodged from the anode in operation of the cell. Suitable magnesium alloys of this kind are, for example, AZ31B and AZ61A, so designated by ASTM nomenclature, and the commercial alloy known as GEMAG. The term magnesium anode as used herein is intended to include anodes made of magnesium and of high magnesium base alloys. The thickness of the anode will be determined on the basis of the operating life for the cell. Generally, an anode thickness of from about .005 to 0.25 inch will be found suitable.

The anode and cathode are spaced apart in the primary cells a distance which is as short as possible to minimize internal cell resistance yet long enough to permit the electrolyte to flow between the electrodes and allow corrosion products of the anode to become detached and washed away. A suitable spacing between anode and cathode is from about $\frac{1}{32}$ to $\frac{3}{16}$ of an inch.

The palladium outer surface on the screen cathode may be applied in the following manner. The wire screen substrate, after having been cleaned and etched, is immersed in a strongly acidified aqueous solution of palladinous chloride for a very short time, about 10 seconds, until bubbling is observed and a pronounced black deposit of palladium is formed on the wire screen. The plated wire screen is then washed with water to remove bath residues. A suitable plating bath is from 20 to 80 volumes of a 5% by weight solution of palladinous chloride in water, strongly acidified with hydrochloric acid, with from 80 to 20 volumes of distilled water. This plating bath and procedure may also be used for providing a granular palladium plating on the electroless nickel underplating on the wire screen substrate.

Cleaning of the wire screen substrate before plating may be accomplished by degreasing it with a volatile solvent, such as benzene, followed by scrubbing with water and a detergent, and then washing with water. Etching of the cleaned wire screen substrate may be accomplished by dipping it, momentarily, first in nitric acid and then in hydrochloric acid, after which it is washed with water to remove acid residues. The nitric acid etching bath may be a 1:1 by volume solution of concentrated nitric acid and water and the hydrochloric acid etching bath, a 1:1 by volume solution of concentrated hydrochloric acid and water.

When an electroless nickel undercoating is applied to the metal wire screen cathode this may be done by the electroless nickel plating method of Brenner and Riddell, Journal of Research, National Bureau of Standards, 39, 385 (1947). However, superior results for cell activity of the cathode are to be obtained with the use of the electroless plating method of Manson and Dytrt described in copending application, Ser. No. 551,185, filed May 13, 1966. A suitable plating bath in this latter method is a solution in water of 12.3% by weight nickelous fluoborate and 2.5% by weight sodium hypophospite maintained at a temperature of approximately 180° F. Immersed in this bath for about three minutes, the wire screen substrate, previously cleaned and etched as above, is provided with an electroless nickel plating of from about 0.5–0.15 mil thickness. The electroless nickel plating is dull, lusterless, in appearance.

The invention will be more fully understood by reference to the further description when read in conjunction with the accompanying drawings in which like numerals indicate like parts and in which:

FIG. 1 is a schematic showing of a primary cell in accordance with the invention, FIG. 2 is a showing of an improved cathode for primary cells in accordance with the invention, FIG. 3 is a detail view in section of a portion of an improved cathode for primary cells of the invention, FIG. 4 is a similar view showing of a modified form of an improved cathode for primary cells of the invention, and FIG. 5 is a group of voltage-current load curves for primary cells activated with sea water and having a magnesium anode and different inert metal cathodes including improved cathodes in accordance with the invention.

In FIG. 1 of the drawing which illustrates a primary cell of the invention, 10 indicates a magnesium plate anode and 12 an improved inert metal cathode. The electrodes are shown connected to a load through an external circuit 13. The electrolyte 14 in the cell may be sea water. As shown, the cell is immersed in the sea.

The screen structure of the improved inert metal cathode 12 appears in greater detail in FIG. 2 where it is illustrated by the use of a woven wire cloth substrate in a preferred embodiment of the cathode.

FIG. 3 illustrates by way of a detail section, and in exaggerated dimensions, a preferred embodiment of the cathode 12 in which the granular palladium plating 15 is deposited directly on the wire screen substrate 16 which, preferably, further, is made of mild steel.

FIG. 4 illustrates in similar manner an embodiment of the cathode 12 in which an electroless nickel plating 17 is deposited on a mild steel wire screen substrate 16 and a granular palladium plating 18 is deposited on this electroless nickel plating.

In operation of a primary cell of the invention having a magnesium anode and an improved inert metal wire screen cathode and activated with sea water, the palladium on the surface of the cathode acts as a catalyst to promote formation of hydrogen ions from water of the electrolyte and thereby, also, dissociation of the water with a consequent accompanying increase in the rate of formation of hydroxyl ions in the electrolyte. The hydroxyl ions remain in the electrolyte by virtue of the auxiliary process in which hydrogen ions are reduced to hydrogen which, as a gas, escapes from the electrolyte. The screen structure of the cathode 12 assists in the promotion of the dissociation reaction by virtue of the large surface area of palladium which it presents to the electrolyte.

The capacity of a primary cell of the invention to yield high current output at a low voltage is demonstrated by the results of the comparative performance tests which appear in the table below and are graphically illustrated by the voltage-current load curves in FIG. 5.

The cell performance tests were conducted with primary cells in which the anode and cathode each measured 2" x 4" and were spaced apart a distance of $\frac{1}{8}$ inch. The anode in each cell was a plate of the magnesium alloy AZ31B. The cathode was either a mild steel plate or a plated mild steel substrate. The cathode in each cell is further identified and the cells related to the voltage-current load curves in FIG. 5 by the following letter code:

A—Steel plate
B—Steel screen (8 inch)
C—Steel plate+nickel electroplating [1]
D—Steel plate+electroless nickel plating
E—Steel plate+electroless nickel plating+granular palladium plating
F—Steel plate+granular palladium plating
G—Steel screen (12 mesh)+electroless nickel plating+granular palladium plating
H—Steel screen (8 mesh)+granular palladium plating ---
[1] Nickel electroplating at a current density of 100 amps/ft.$^2$.

The electrolyte used in the cells in the performance tests was an artificial sea water made from tap water and a salt mixture, ASTM, D141–52, Formula A. This salt mixture is commercially available under the tradename Sea Salt and has the following composition by weight:

| | Percent |
|---|---|
| NaCl | 58.49 |
| Na$_2$SO$_4$ | 9.75 |
| CaCl$_2$ | 2.765 |
| KBr | 0.238 |
| NaHCO$_3$ | 0.477 |
| H$_3$BO$_3$ | 1.071 |
| MgCl$_2$.6H$_2$O | 26.4 |
| SrCl$_2$.6H$_2$O | 0.095 |
| NaF | 0.007 |

The electrolyte was prepared by forming a solution in tap water which contained the salt mixture in the proportion of 41.953 grams per liter. This solution has a pH of 8.2–8.4 and corresponds to sea water 12 miles out.

TABLE

| Current, amps | Current density (J), amps/ft.² | Cell voltage | | | | | | | |
|---|---|---|---|---|---|---|---|---|---|
| | | A | B | C | D | E | F | G | H |
| | 0.486 | .345 | | | | | | | |
| | 0.63 | | | | .415 | | | | |
| | 0.9 | | | .375 | | .605 | | | |
| | 1.02 | | | | | | .65 | | |
| | 1.1 | | | | | | | .84 | |
| 0.1 | 1.8 | .187 | 2.71 | .337 | .343 | .57 | .62 | .72 | .73 |
| 0.2 | 3.6 | .071 | .19 | .272 | .278 | .46 | .52 | .69 | .765 |
| | | .028 | | | | | | | |
| 0.3 | 5.4 | J=4.5 | .132 | .220 | .230 | .39 | .45 | .645 | .655 |
| 0.4 | 7.2 | | .086 | .175 | .191 | .333 | .39 | .61 | .63 |
| 0.5 | 9.0 | | .045 | .140 | .157 | .283 | .337 | .57 | .585 |
| 0.6 | 10.8 | | | .107 | .125 | .241 | .292 | .54 | .55 |
| 0.7 | 12.6 | | | | | .205 | .256 | .50 | .515 |
| 0.8 | 14.4 | | | | | .172 | .225 | .47 | .485 |
| 0.9 | 16.2 | | | | | .140 | .194 | .44 | .46 |
| 1.0 | 18.0 | | | | | .110 | .167 | .405 | .43 |

A reading of the voltage and current values in the above table and of the voltage-current load curves in FIG. 5 shows the primary cells G and H, equipped with an improved inert metal cathode in accordance with the invention, to be superior in their voltage-current characteristic to the primary cells in which the cathode is of prior art solid plate construction which has been modified or not by the application thereto of a nickel plating which is electroplated or electroless plated, or of a nickel electroless plating and a granular palladium plating, or of a granular palladium plating.

In use as power sources, the primary cells may be mounted or supported in any convenient way as by the use of plastic insulating supports.

The primary cells of the invention may be coupled to known tunnel diode inverters, such as described by Marzolf in Naval Research Report 5706 (1961) and U.S. Patent No. 3,167,723, and used as power sources for purposes which call for higher voltage levels than possessed by the cells alone, such as 6 to 30 volts. The primary cells may also be assembled as sea batteries.

While the invention has been described herein with reference to certain specific embodiments thereof, it is intended that such shall be taken by way of illustration and not in limitation except as may be defined in the appended claims.

What is claimed is:

1. A primary cell comprising in combination a magnesium anode and an inert metal wire screen cathode in which the wire of the screen has an outer surface of granular palladium plating and the plated wire screen is an openwork of from about 8 to 40 mesh.

2. A primary cell as defined in claim 1, wherein the plated wire screen of the cathode is from about 8 to 24 mesh.

3. A primary cell as defined in claim 1, wherein the plated wire screen of the cathode is from about 8 to 12 mesh.

4. A primary cell as defined in claim 1, wherein the wire of the screen has an under plating of electroless nickel.

References Cited

UNITED STATES PATENTS

| | | |
|---|---|---|
| 2,050,172 | 8/1936 | Gordon. |
| 2,050,173 | 8/1936 | Gordon. |
| 2,070,612 | 2/1937 | Niederreither. |
| 2,925,455 | 2/1960 | Eidensohn et al. _____ 136—100 |
| 3,036,141 | 5/1962 | Goldenberg et al. |
| 3,117,032 | 1/1964 | Panzer _____ 136—100 |
| 3,177,099 | 4/1965 | Kirk et al. |
| 3,183,122 | 5/1965 | White et al. |
| 3,185,592 | 5/1965 | Kirk et al. |
| 3,216,919 | 11/1965 | White et al. |
| 3,226,263 | 12/1965 | Oswin. |
| 3,282,737 | 11/1966 | Hintermann et al. |
| 3,311,508 | 3/1967 | Biddick et al. |

WINSTON A. DOUGLAS, Primary Examiner

C. F. LE FEVOUR, Assistant Examiner

U.S. Cl. X.R.

136—90